US008654968B2

(12) United States Patent
Mai et al.

(10) Patent No.: US 8,654,968 B2
(45) Date of Patent: Feb. 18, 2014

(54) SPEAKER MODULE AND ELECTRONIC APPARATUS THEREOF

(75) Inventors: Ching-Chia Mai, Hsinchu (TW); Kuan-Hsueh Tseng, Hsinchu (TW); Cheng-Han Lee, Hsinchu (TW); Chih-Ming Wang, Hsinchu (TW)

(73) Assignee: Wistron NeWeb Corporation, Hsinchu Science Park, Hsinchu (TW)

( * ) Notice: Subject to any disclaimer, the term of this patent is extended or adjusted under 35 U.S.C. 154(b) by 0 days.

(21) Appl. No.: 13/361,961

(22) Filed: Jan. 31, 2012

(65) Prior Publication Data

US 2013/0070952 A1 Mar. 21, 2013

(30) Foreign Application Priority Data

Sep. 21, 2011 (TW) ............................ 100217682 U

(51) Int. Cl.
*H04M 1/00* (2006.01)

(52) U.S. Cl.
USPC ....................... 379/433.02; 343/702; 379/440

(58) Field of Classification Search
USPC .............................. 379/440, 433.02; 343/702
See application file for complete search history.

(56) References Cited

U.S. PATENT DOCUMENTS

| | | | | |
|---|---|---|---|---|
| 4,123,756 | A * | 10/1978 | Nagata et al. | 343/702 |
| 6,266,020 | B1 * | 7/2001 | Chang | 343/702 |
| 6,995,715 | B2 * | 2/2006 | Ying et al. | 343/702 |
| 7,486,243 | B2 * | 2/2009 | Wulff et al. | 343/702 |
| 7,554,494 | B2 * | 6/2009 | Kim et al. | 343/702 |
| 7,750,854 | B2 * | 7/2010 | Wedel et al. | 343/702 |
| 2009/0167616 | A1 * | 7/2009 | Chen | 343/702 |

* cited by examiner

*Primary Examiner* — Curtis Kuntz
*Assistant Examiner* — Ryan Robinson
(74) *Attorney, Agent, or Firm* — Winston Hsu; Scott Margo

(57) ABSTRACT

A speaker module for installing on an electronic device is disclosed. The speaker module includes a containing casing, a speaker device, an antenna, at least one audio signal transmitting member, and at least one antenna signal transmitting member. The containing casing has at least one hole formed thereon. The speaker device is disposed in the containing casing and outputs sound via the hole. The antenna is formed integrally with the containing casing along the contour of the containing casing. The audio signal transmitting member is electrically connected to the speaker device for electrically connecting to the electronic device, so as to establish audio signal transmission between the speaker device and the electronic device. The antenna signal transmitting member is electrically connected to the antenna for electrically connecting to the electronic device, so as to establish antenna signal transmission between the antenna and the electronic device.

5 Claims, 6 Drawing Sheets

SPEAKER MODULE AND ELECTRONIC APPARATUS THEREOF

BACKGROUND OF THE INVENTION

1. Field of the Invention

The present invention relates to a speaker module and an electronic apparatus thereof, and more specifically, to a speaker module having an antenna formed integrally with a speaker casing and an electronic apparatus thereof.

2. Description of the Prior Art

For an electronic apparatus with a sound outputting function and a wireless transmission function (e.g. a notebook or a mobile phone), either an antenna or a speaker device is independently installed in the electronic apparatus, meaning that both of them need to occupy partial inner space of the electronic apparatus. However, as an electronic apparatus increasingly becomes lighter, thinner, shorter, and smaller in recent years, the design that an antenna and a speaker device are separately disposed in the electronic apparatus is not only disadvantageous for the thinning design of the electronic apparatus, but also limits the structural design of the electronic apparatus and flexibility of the electronic apparatus in use of its inner space.

Thus, many designs for integrating an antenna into a speaker device have been developed to solve the aforesaid problems. However, since these designs usually utilize a structure connection method, such as the design for supporting an antenna on a speaker device disclosed in US patent publication No. 20030072131, it may make the connection design for the antenna and the speaker device too complicated so as to cause a strenuous and time-consuming assembly process. Furthermore, if the speaker device has a casing with a complicated structural design, the problem that the antenna is unable to be assembled with the speaker device may also occur. In addition, in these designs, since there is usually an assembly gap formed between the antenna and the speaker device, the speaker device may resonate the antenna to generate annoying noise while the speaker device outputs sound.

SUMMARY OF THE INVENTION

The present invention provides a speaker module for installing on an electronic device. The speaker module includes a containing casing, a speaker device, an antenna, at least one audio signal transmitting member, and at least one antenna signal transmitting member. The containing casing has at least one hole formed thereon. The speaker device is disposed in the containing casing and outputs sound via the hole. The antenna is formed integrally with the containing casing along the contour of the containing casing. The audio signal transmitting member is electrically connected to the speaker device for electrically connecting to the electronic device, so as to establish audio signal transmission between the speaker device and the electronic device. The antenna signal transmitting member is electrically connected to the antenna for electrically connecting to the electronic device, so as to establish antenna signal transmission between the antenna and the electronic device.

The present invention further provides an electronic apparatus. The electronic apparatus includes an electronic device, a speaker module, and an antenna. The speaker module is installed on the electronic device. The speaker module includes a containing casing, a speaker device, an antenna, at least one audio signal transmitting member, and at least one antenna signal transmitting member. The containing casing has at least one first hole formed thereon. The speaker device is disposed in the containing casing for outputting sound via the first hole. The audio signal transmitting member is electrically connected to the speaker device for electrically connecting to the electronic device, so as to establish audio signal transmission between the speaker device and the electronic device. The antenna signal transmitting member is electrically connected to the electronic device. The antenna is electrically connected to the antenna signal transmitting member for establishing antenna signal transmission between the antenna and the electronic device. The antenna is formed integrally with the containing casing along a contour of the containing casing or on the electronic device corresponding to the speaker module along a contour of the electronic device.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
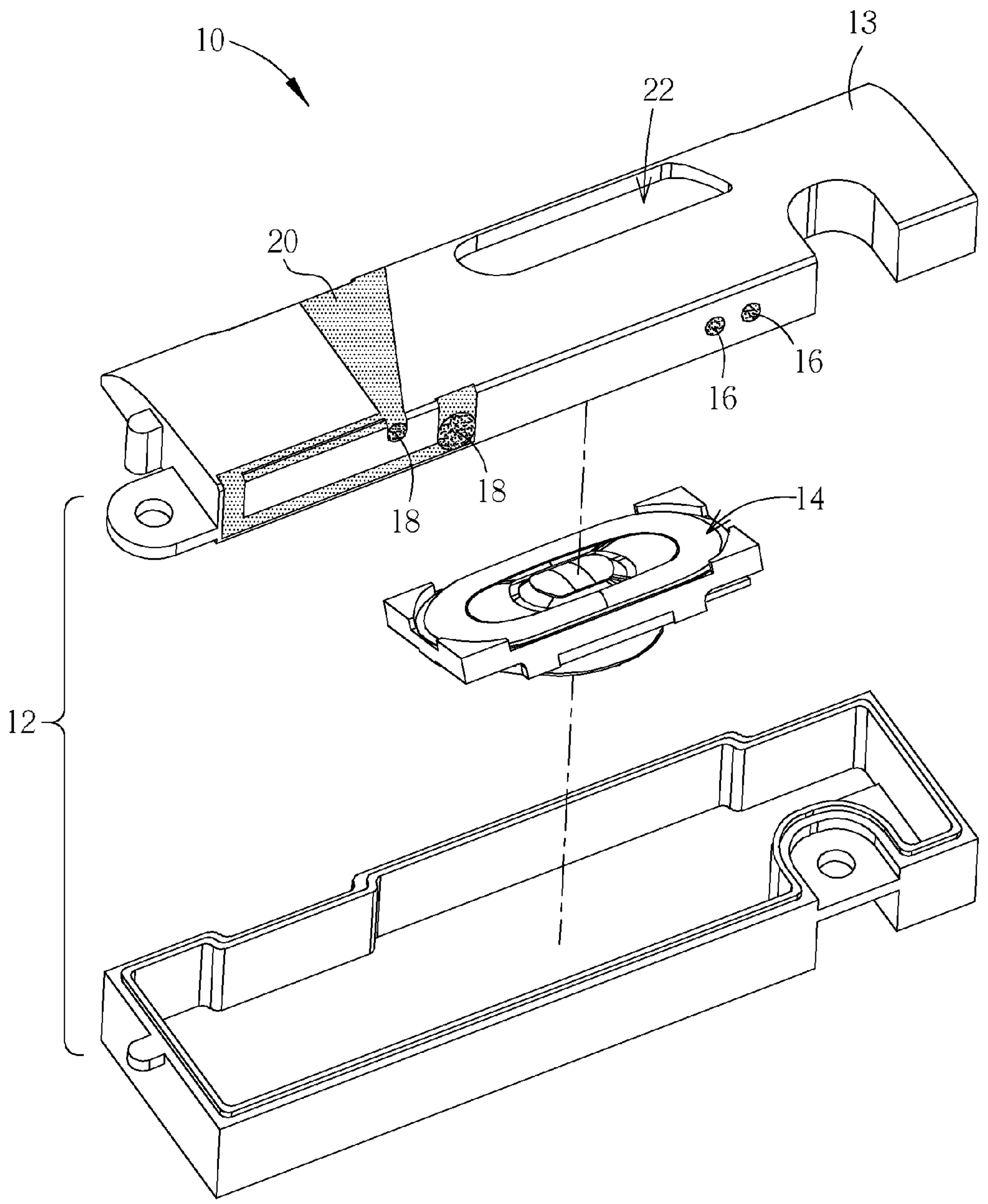
FIG. 1 is an exploded diagram of a speaker module according to a first embodiment of the present invention.
Figure 2:
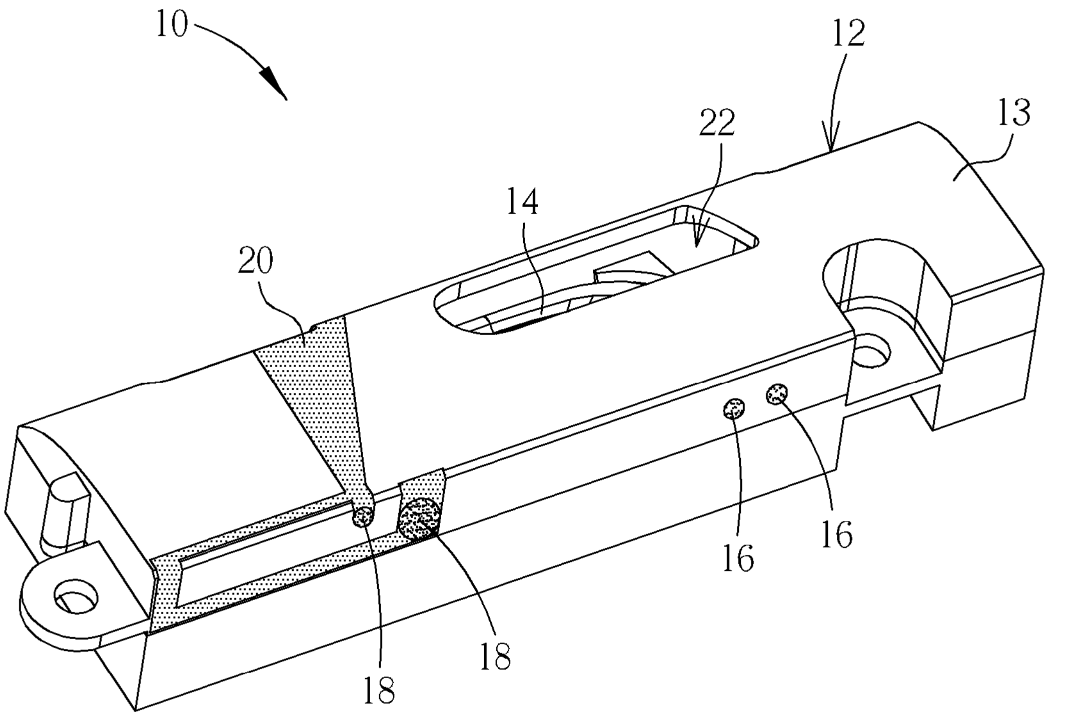
FIG. 2 is an assembly diagram of the speaker module in FIG.

Please refer to FIG. 1 and FIG. 2. FIG. 1 is an exploded diagram of a speaker module 10 according to a first embodiment of the present invention. FIG. 2 is an assembly diagram of the speaker module 10 in FIG. 1. In this embodiment, the speaker module 10 is utilized to install on a conventional electronic device (e.g. a notebook or a mobile phone) for providing the electronic device with a sound outputting function and a wireless transmission function. The related installation method is commonly seen in the prior art (e.g. a structural engagement method, a fusion-bonding method, or a screw locking method) and therefore omitted herein.

As shown in FIG. 1 and FIG. 2, the speaker module 10 includes a containing casing 12, a speaker device 14, at least one sound signal transmitting member 16 and at least one antenna signal transmitting member 18 (two shown in FIG. 1 respectively, but not limited thereto), and an antenna 20. The containing casing 12 has at least one hole 22 (one shown in FIG. 1, but not limited thereto) formed opposite to a sound outputting position of the speaker device 14 for allowing the speaker device 14 to directly output sound out of the containing casing 12. As for the structural design of the containing casing 12, it utilizes a conventional design for a speaker casing applied to an electronic device. The sound signal transmitting member 16 is electrically connected to the speaker device 14. The antenna signal transmitting member 18 is electrically connected to the antenna 20 for electrically connecting to an electronic device, in which the speaker module 10 is installed, so as to establish sound signal transmission between the speaker device 14 and the electronic device and antenna signal transmission between the antenna 20 and the electronic device.

In this embodiment, the sound signal transmitting member 16 is a sound signal transmitting contact, and the antenna signal transmitting member 18 is an antenna signal transmitting contact. To be more specific, in this embodiment, the speaker device 14 utilizes the sound signal transmitting contacts to be coupled to its positive and negative poles, and then, to be coupled to corresponding contacts in the electronic device when the speaker module 10 is installed on the electronic device. Similarly, the antenna 20 utilizes the antenna signal transmitting contacts to be coupled to its feeding and ground poles, and then, to be coupled to corresponding contacts in the electronic device when the speaker module 10 is installed on the electronic device.

As for forming of the antenna 20, it can be as shown in FIG. 1 and FIG. 2. The antenna 20 is formed on the containing casing 12 along the contour of the containing casing 12. In this embodiment, the antenna 20 is formed on an outer surface 13 of the containing casing 12 by an LDS (Laser Direct Structuring) process. In brief, Laser is utilized to generate an activation layer corresponding to the shape of the antenna 20 on the outer surface 13 of the containing casing 12, and an electroplating process is then performed to adhere metal material on the activation layer. Accordingly, the antenna 20 can be formed on the containing casing 12 along the contour of the outer surface 13. In such a manner, via the said design that the antenna 20 is integrally formed with the containing casing 12, the present invention can efficiently reduce space occupied by the antenna in the electronic device, so as to increase flexibility of the electronic device in use of its inner space. Furthermore, the present invention can also avoid the complicated connection design for the antenna and the speaker device and resonance of the antenna with the speaker device while the speaker device outputs sound. In addition, the present invention can further solve the aforesaid problem that the antenna is unable to be assembled with the speaker device if the speaker device has a casing with a complicated structural design.

To be noted, the speaker module 10 can also utilize other process with the same forming effect, such as a pad printing process, an insert molding process, or an Ag paste printing process. In other words, all processes capable of making the antenna 20 integrally formed with the containing casing 12 along the contour of the containing casing 12 may fall within the scope of the present invention. In addition, the antenna 20 can be formed on an inner wall of the containing casing 12 instead.

Furthermore, electrical connection of the sound signal transmitting member 16 and the speaker device 14 and electrical connection of the antenna signal transmitting member 18 and the antenna 20 are not limited to the aforesaid embodiment, meaning that the present invention can utilize other electrical connection design, such as a cable connection design or a clip connection design. For example, please refer to FIG. 3, which is a diagram of a speaker module 100 according to a second embodiment of the present invention. Components both mentioned in this embodiment and the aforesaid embodiment represent components with similar structures and functions, and the related description is therefore omitted herein.

Figure 3:
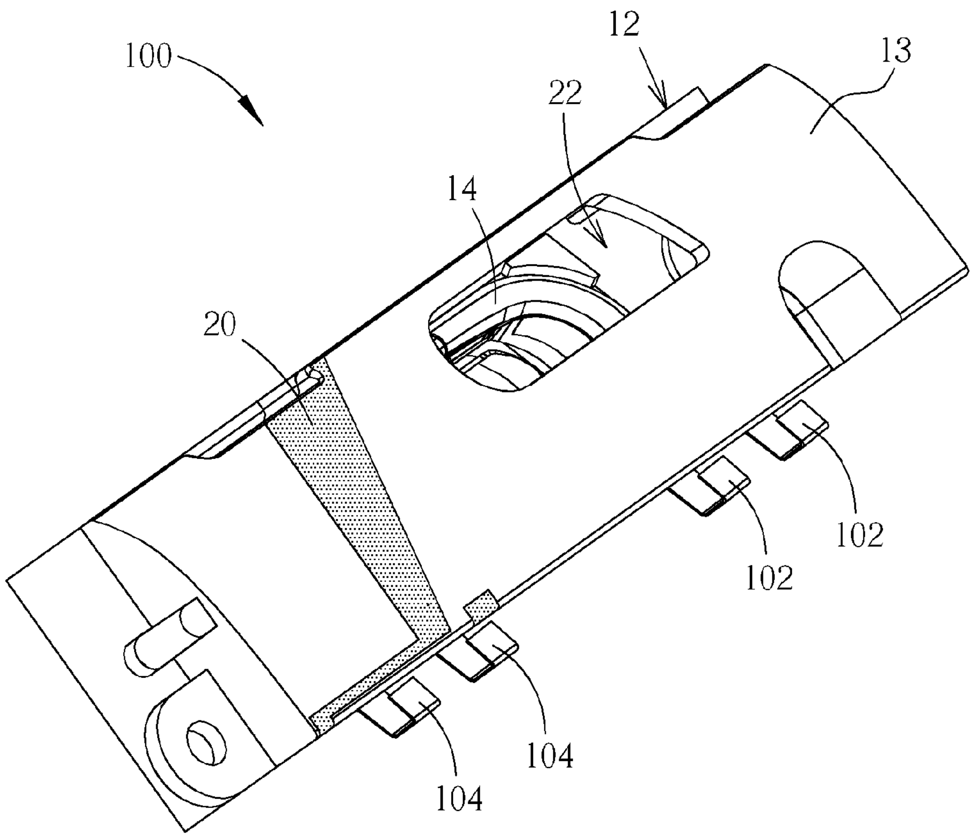
FIG. 3 is a diagram of a speaker module according to a second embodiment of the present invention.

As shown in FIG. 3, the speaker module 100 includes the containing casing 12, the speaker device 14, the antenna 20, and at least one sound signal transmitting member 102 and at least one antenna signal transmitting member 104 (two shown in FIG. 3 respectively). In This embodiment, the sound signal transmitting member 102 is a sound signal transmitting clip, and the antenna signal transmitting member 104 is an antenna signal transmitting clip. To be more specific, the speaker device 14 utilizes the sound signal transmitting clips to be coupled to its positive and negative poles, and then, to be coupled to corresponding contacts in the electronic device when the speaker module 100 is installed on the electronic device. Similarly, the antenna 20 utilizes the antenna signal transmitting clips to be coupled to its feeding and ground poles, and then, to be coupled to corresponding contacts in the electronic device when the speaker module 100 is installed on the electronic device.

Figure 4:
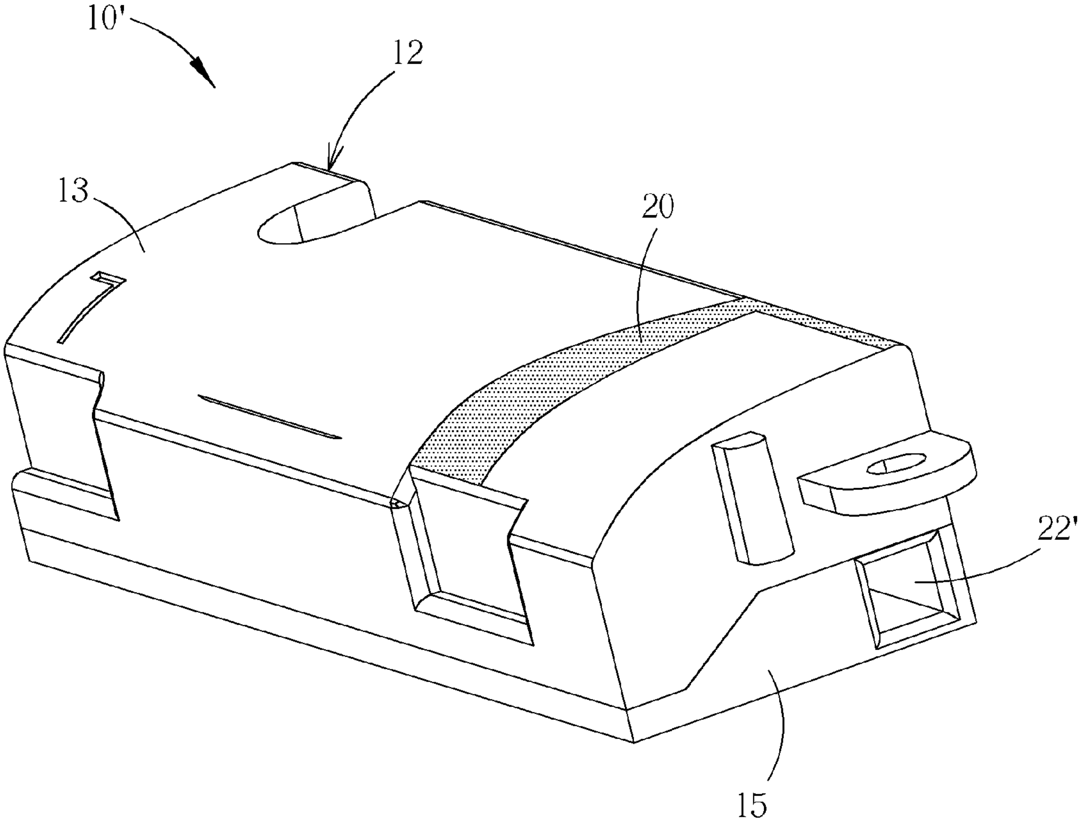
FIG. 4 is a diagram of a speaker module according to a third embodiment of the present invention.

Furthermore, the forming position of the hole 22 is not limited to the position opposite to the sound outputting position of the speaker device 14, meaning that the hole 22 can also be formed at other position of the containing casing 12. For example, please refer to FIG. 4, which is a diagram of a speaker module 10' according to a third embodiment of the present invention. The major difference between the speaker module 10' and the speaker module 10 is the forming position of the hole. As shown in FIG. 4, a hole 22' is formed on a side surface 15 of the containing casing 12 of the speaker module 22'. Accordingly, the hole 22' is not only used as a sound outputting hole of the speaker device 14 (not shown in FIG. 4), but is also used as a pressure relief hole of the containing casing 12. Furthermore, since the hole 22' is formed on the side surface 15 instead of being formed on the upper surface 13, the purpose that the upper surface 13 can provide more space for forming of the antenna 20 is achieved accordingly, so as to increase the design flexibility of the antenna 20.

Figure 5:
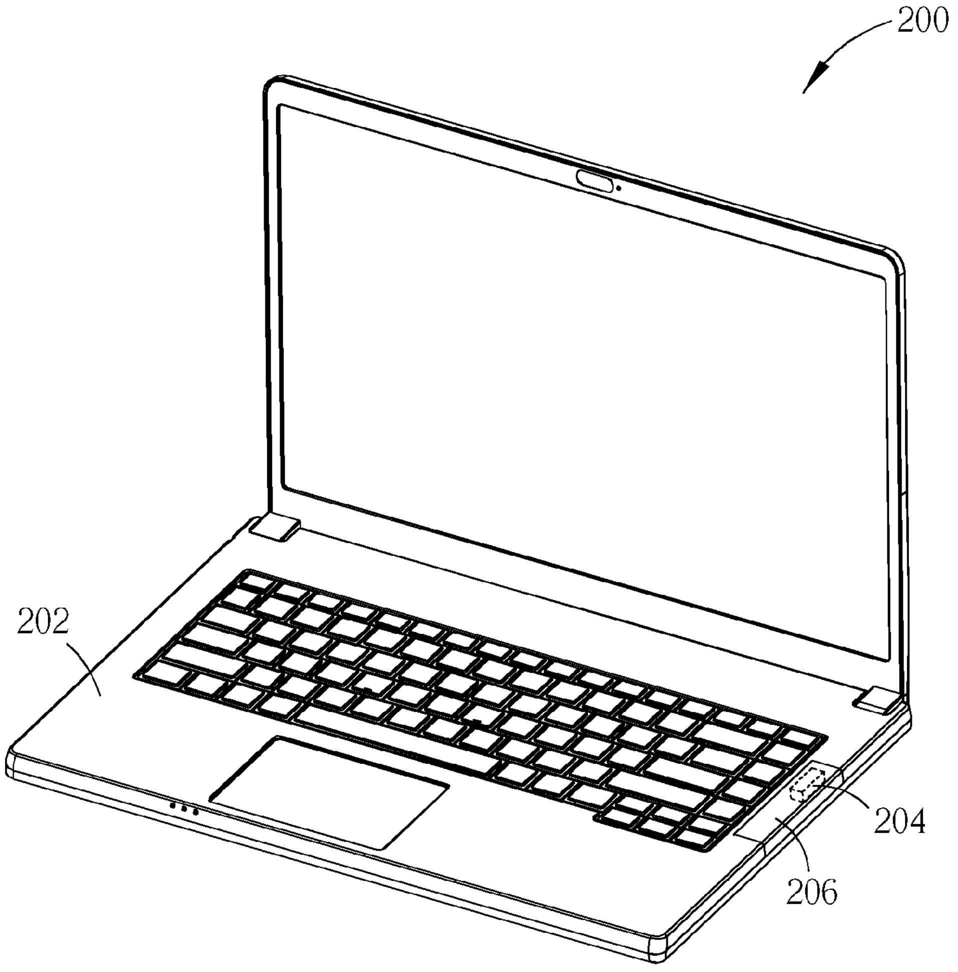
FIG. 5 is a diagram of an electronic apparatus according to a fourth embodiment of the present invention.

It should be mentioned that the present invention can also utilize a design that the speaker module is installed on the electronic device via an attachment part of the electronic device. For example, please refer to FIG. 5, which is a diagram of an electronic apparatus 200 according to a fourth embodiment of the present invention. As shown in FIG. 5, the electronic apparatus 200 includes an electronic device 202 (e.g. a notebook shown in FIG. 5) and a speaker module 204 (depicted in dotted lines in FIG. 5). The electronic device 202 has an attachment part 206. The speaker module 204 is disposed in the attachment part 206 for installing in the electronic device 202.

Figure 6:
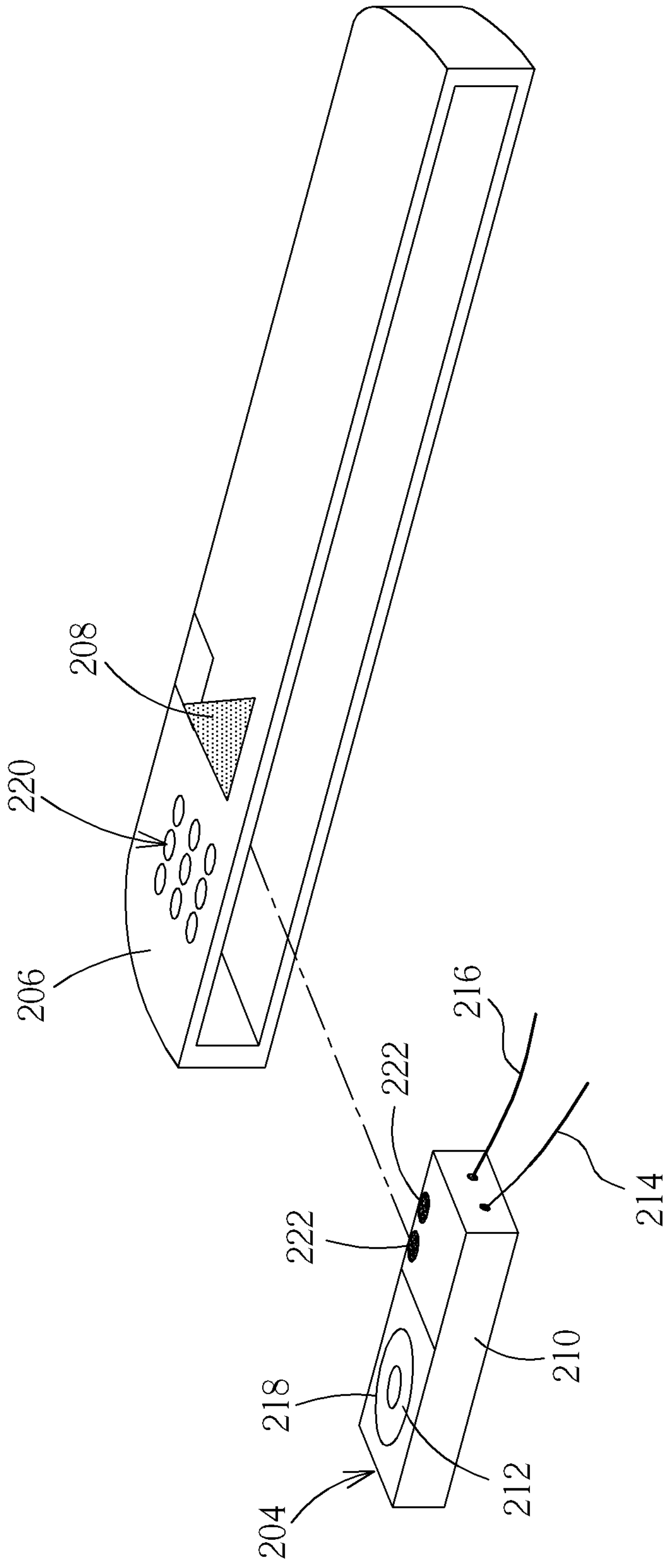
FIG. 6 is an exploded diagram of a speaker module and an attachment part in FIG. 5.

Please refer to FIG. 5 and FIG. 6 at the same time. FIG. 6 is an exploded diagram of the speaker module 204 and the attachment part 206 in FIG.5. As shown in FIG. 6, the electronic apparatus 200 further includes an antenna 208. The speaker module 204 includes a containing casing 210, a speaker device 212, and at least one sound signal transmitting member 214 and at least one antenna signal transmitting member 216 (one shown in FIG. 6 respectively). The sound signal transmitting member 214 is electrically connected to the speaker device 212 for electrically connecting to the electronic device 202 to establish sound signal transmission between the speaker device 212 and the electronic device 202, and the antenna signal transmitting member 216 is electrically connected to the electronic device 202. The sound signal transmitting member 214 is preferably a sound signal transmitting cable and the antenna signal transmitting member 216 is an antenna signal transmitting cable (but not limited thereto). The sound signal transmitting member 214 and the antenna signal transmitting member 216 can also be other connection component, such as a signal transmitting contact or a signal transmitting clip mentioned in the aforesaid embodiments.

The containing casing 210 has at least one first hole 218 (one shown in FIG. 6). At least one second hole 220 (plural shown in FIG. 6) is formed on the attachment part 206 corresponding to the first hole 218. The first hole 218 is formed opposite to a sound outputting position of the speaker device 212. Accordingly, the speaker device 212 can output sound directly via the first hole 218 and the second hole 220. The antenna 208 is formed on the attachment part 206 corresponding to the speaker module 204 along a contour of the attachment part 206. As for the related description for the forming process of the antenna 208, it can be reasoned by analogy according to the aforesaid embodiments and therefore omitted herein. Furthermore, as shown in FIG. 6, the containing casing 210 further has at least one antenna contact 222 (two shown in FIG. 6) formed thereon. The antenna contact 222 is electrically connected to the antenna signal transmitting member 216 for electrically connecting to the antenna 208 when the speaker module 204 is disposed in the attachment part 206, so as to establish antenna signal transmission between the antenna 208 and the electronic device 202.

Via the design that the antenna 208 is directly formed on the attachment part 206, the present invention not only reduces space occupied by the antenna 208 in the electronic apparatus 200 and solve the aforesaid problems, but also utilizes the attachment part 206 to provide more space (compared with the containing casing 210) for forming of the antenna 208, so that the present invention can be further applied to a large-sized antenna (e.g. a near-field communication (NFC) antenna). Furthermore, in practical application, the antenna 208 can be formed on the containing casing 210 instead of being formed on the attachment part 206, meaning that the attachment part 206 is only used as an auxiliary component for installation of the speaker module 204 on the electronic device 202. As for which design is utilized, it depends on the manufacturing needs of the electronic apparatus 200.

Compared with the prior art, the present invention utilizes the design that the antenna is integrally formed with the containing casing of the speaker module or the attachment part of the electronic device, to efficiently reduce space occupied by the antenna in the electronic device, so that flexibility of the electronic device in use of its inner space can be increased. Via the said design, the present invention can also avoid the complicated connection design for the antenna and the speaker device and resonance of the antenna with the speaker device while the speaker device outputs sound. In addition, the present invention can further solve the aforesaid problem that the antenna is unable to be assembled with the speaker device if the speaker device has a casing with a complicated structural design. Furthermore, via the design that the antenna is formed on the attachment part of the electronic device, the present invention can be further applied to a large-sized antenna.

What is claimed is:

1. An electronic apparatus comprising:

an electronic device having an attachment part;

a speaker module installed on the electronic device, the speaker module comprising:

a containing casing having at least one first hole formed thereon and at least one antenna contact formed thereon, at least one second hole being formed on the attachment part corresponding to the at least one first hole;

a speaker device disposed in the containing casing for outputting sound via the first hole;

at least one audio signal transmitting member electrically connected to the speaker device for electrically connecting to the electronic device, so as to establish audio signal transmission between the speaker device and the electronic device; and at least one antenna signal transmitting member electrically connected to the electronic device and the antenna contact; and an antenna formed integrally with the attachment part along a contour of the attachment part, the antenna being electrically connected to the antenna signal transmitting member via the antenna contact when the speaker module is disposed in the attachment part for establishing antenna signal transmission between the antenna and the electronic device.

2. The electronic apparatus of claim 1, wherein the antenna is formed integrally with the attachment part by an LDS process, an Ag printing process, a pad printing process, or an insert molding process.

3. The electronic apparatus of claim 1, wherein the antenna is formed on an outer surface or an inner wall of the attachment part.

4. The electronic apparatus of claim 1, wherein the audio signal transmitting member is an audio signal transmitting cable, an audio signal transmitting clip, or an audio signal transmitting contact.

5. The electronic apparatus of claim 1, wherein the antenna signal transmitting member is an antenna signal transmitting cable, an antenna signal transmitting clip, or an antenna signal transmitting contact.

* * * * *